United States Patent [19]

Weder et al.

[11] Patent Number: 5,501,039
[45] Date of Patent: Mar. 26, 1996

[54] METHOD OF FORMING A FLOWER POT OR FLOWER POT COVER WITH CONTROLLED PLEATS

[75] Inventors: Donald E. Weder; Joseph G. Straeter, both of Highland, Ill.; Frank J. Craig, Valley Park, Mo.

[73] Assignee: Highland Supply Corporation, Highland, Ill.

[21] Appl. No.: 280,407

[22] Filed: Jul. 26, 1994

Related U.S. Application Data

[60] Continuation of Ser. No. 54,929, Apr. 28, 1993, which is a division of Ser. No. 737,752, Jul. 30, 1991, Pat. No. 5,228,934, which is a division of Ser. No. 422,653, Oct. 17, 1989, Pat. No. 5,073,161, which is a continuation-in-part of Ser. No. 366,588, Jun. 15, 1989, Pat. No. 5,111,613, Ser. No. 397,114, Aug. 22, 1989, Pat. No. 5,029,412, Ser. No. 367,098, Jun. 15, 1989, Pat. No. Des. 318,030, and Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.$^6$ ............................................. A01G 9/02
[52] U.S. Cl. ............................................. 47/72; 229/400
[58] Field of Search ........................ 47/72; 229/1.5 B, 229/400, 404

[56] References Cited

U.S. PATENT DOCUMENTS

| | | | |
|---|---|---|---|
| 239,987 | 4/1981 | Shellenberger . | |
| D. 254,659 | 4/1980 | Karotseris | D11/143 |
| D. 292,562 | 11/1987 | Weder et al. | D11/164 |
| D. 292,563 | 11/1987 | Weder et al. | D11/164 |
| D. 293,224 | 12/1987 | Weder et al. | D11/164 |
| D. 293,774 | 1/1988 | Weder et al. | D11/164 |
| D. 293,775 | 1/1988 | Weder et al. | D11/164 |
| 418,553 | 12/1889 | Chamberlain | 229/400 |
| 716,668 | 12/1902 | Cheney . | |
| 732,889 | 7/1903 | Paver . | |
| 860,904 | 7/1907 | Chamberlain | 229/1.5 B |
| 923,663 | 6/1909 | Kroeger . | |
| 1,002,346 | 9/1911 | Weeks . | |
| 1,006,722 | 10/1911 | Claussen | 229/1.5 B |
| 1,052,379 | 2/1913 | Ranken . | |
| 1,069,675 | 8/1913 | Claussen | 47/72 |
| 1,117,848 | 11/1914 | House | 229/1.5 B |
| 1,206,708 | 11/1916 | Hutchins . | |
| 1,421,027 | 6/1922 | Reynolds . | |
| 1,446,563 | 2/1923 | Hughes . | |
| 1,693,435 | 11/1928 | Clarke . | |
| 1,714,293 | 5/1929 | Batdorf | 229/1.5 B |
| 1,863,216 | 6/1932 | Wordingham . | |
| 1,868,853 | 7/1932 | Sievers . | |
| 1,920,533 | 8/1933 | Strauss | 281/34 |
| 1,978,631 | 10/1934 | Herrlinger | 91/68 |

(List continued on next page.)

FOREIGN PATENT DOCUMENTS

| | | |
|---|---|---|
| 163453 | 4/1985 | European Pat. Off. . |
| 2036163 | 12/1970 | France . |
| 2272914 | 1/1976 | France . |
| 2489126 | 3/1982 | France . |
| 2948265 | 5/1981 | Germany . |
| 226548 | 9/1989 | Japan ............................... 229/1.5 B |
| 8101464 | 10/1982 | Netherlands . |
| 274167 | 7/1949 | Switzerland . |
| 560532 | 4/1975 | Switzerland . |
| 28130 | 9/1907 | United Kingdom . |
| 1204647 | 9/1970 | United Kingdom . |

OTHER PUBLICATIONS

The Condensed Chemical Dictionary (Eighth Edition) copy in 3506 p. 789.

*Primary Examiner*—Henry E. Raduazo
*Attorney, Agent, or Firm*—Dunlap & Codding

[57] ABSTRACT

An apparatus and method for forming a sheet of material into a flower pot or flower pot cover comprising means for engaging portions of the sheet of material and forming pleats in predetermined portions of the sheet of material having a predetermined shape whereby the formed flower pot or flower pot cover has pleats in predetermined portions and of predetermined shapes.

1 Claim, 5 Drawing Sheets

U.S. PATENT DOCUMENTS

| | | | |
|---|---|---|---|
| 1,979,771 | 11/1934 | Potter | 47/41 |
| 2,016,434 | 10/1935 | Hantley | 229/400 |
| 2,054,934 | 9/1936 | Graffenberger | 229/400 |
| 2,076,212 | 4/1937 | Suter et al. | 91/67.9 |
| 2,123,075 | 7/1938 | Langa | 47/34 |
| 2,152,648 | 4/1939 | Jones | 47/34 |
| 2,278,673 | 4/1942 | Savada et al. | 154/43 |
| 2,302,259 | 11/1942 | Rothfuss | 41/10 |
| 2,367,749 | 1/1945 | Barbieri | 47/72 |
| 2,387,778 | 10/1945 | Stocking | 229/400 |
| 2,411,328 | 11/1946 | Macnab | 33/12 |
| 2,459,023 | 1/1949 | Hamilton | 229/400 |
| 2,482,981 | 9/1949 | Kamrass | 41/13 |
| 2,510,120 | 6/1950 | Leander | 117/122 |
| 2,529,060 | 11/1950 | Trillich | 117/68.5 |
| 2,774,187 | 12/1956 | Smithers | 47/41 |
| 2,822,287 | 2/1958 | Avery | 117/14 |
| 2,845,735 | 8/1958 | Werner | 41/10 |
| 2,942,823 | 6/1960 | Chapman | 248/97 |
| 2,967,652 | 1/1961 | Canfield | 229/1.5 B |
| 3,022,605 | 2/1962 | Reynolds | 47/58 |
| 3,094,810 | 6/1963 | Kalpin | 47/37 |
| 3,130,113 | 4/1964 | Silman | 161/97 |
| 3,271,922 | 9/1966 | Wallerstein et al. | 53/3 |
| 3,376,666 | 4/1968 | Leonard | 47/11 |
| 3,488,022 | 1/1970 | Vittori | 248/152 |
| 3,552,059 | 1/1971 | Moore | 47/41.12 |
| 3,554,434 | 1/1971 | Anderson | 229/55 |
| 3,620,366 | 11/1971 | Parkinson | 206/59 C |
| 3,681,105 | 8/1972 | Milutin et al. | 117/15 |
| 3,733,023 | 5/1973 | Arneson | 229/400 |
| 3,775,903 | 12/1973 | Pike | 47/37 |
| 3,869,828 | 3/1975 | Matsumoto | 47/34.11 |
| 3,974,960 | 8/1976 | Mitchell | 229/62 |
| 4,043,077 | 8/1977 | Stonehocker | 47/66 |
| 4,054,697 | 10/1977 | Reed et al. | 428/40 |
| 4,118,890 | 10/1978 | Shore | 47/28 R |
| 4,216,620 | 8/1980 | Weder et al. | 47/72 |
| 4,283,032 | 8/1981 | Smith | 248/97 |
| 4,297,811 | 11/1981 | Weder | 47/72 |
| 4,300,312 | 11/1981 | Weder et al. | 47/72 |
| 4,338,979 | 7/1982 | Dow | 141/10 |
| 4,340,146 | 7/1982 | Stratton | 215/100.5 |
| 4,380,564 | 4/1983 | Cancio et al. | 428/167 |
| 4,400,910 | 8/1983 | Koudstaal et al. | 47/84 |
| 4,413,725 | 11/1983 | Bruno et al. | 206/45.33 |
| 4,488,697 | 12/1984 | Garvey | 248/101 |
| 4,508,223 | 4/1985 | Catrambone | 206/423 |
| 4,621,733 | 11/1986 | Harris | 206/423 |
| 4,717,262 | 1/1988 | Roen et al. | 383/120 |
| 4,733,521 | 3/1988 | Weder et al. | 53/580 |
| 4,773,182 | 9/1988 | Weder | 47/72 |
| 4,795,601 | 1/1989 | Cheng | 264/138 |
| 4,835,834 | 6/1989 | Weder et al. | 29/525 |

METHOD OF FORMING A FLOWER POT OR FLOWER POT COVER WITH CONTROLLED PLEATS

This application is a continuation of U.S. Ser. No. 08/054,929, filed Apr. 28, 1993, which is a divisional of application U.S. Ser. No. 737,752, filed Jul. 30, 1991 entitled FLOWER POT OR FLOWER POT COVER WITH CONTROLLED PLEATS amended to A METHOD OF FORMING A FLOWER POT OR FLOWER POT COVER WITH CONTROLLED PLEATS, now U.S. Pat. No. 5,228,934, which is a divisional of U.S. Ser. No. 422,653, filed Oct. 17, 1989, now U.S. Pat. No. 5,073,161 issued Dec. 17, 1991, which is a continuation-in-part of U.S. Ser. No. 366,588, filed Jun. 15, 1989, now U.S. Pat. No. 5,111,613 issued May 12, 1992 and a continuation-in-part of U.S. Ser. No. 397,114, filed Aug. 22, 1989, now U.S. Pat. No. 5,029,412 issued Jul 9, 1991, and a continuation-in-part of U.S. Ser. No. 367,098, filed Jun. 15, 1989, now U.S. Pat. No. 0,318,030 issued Jul. 9, 1991, and a continuation-in-part of U.S. Ser. No. 219,083, filed Jul. 13, 1988, now U.S. Pat. No. 4,897,031 issued Jan. 30, 1990 which is a continuation of U.S. Ser. No. 07/004,275, filed Jan. 5, 1987, now U.S. Pat. No. 4,773,182, which is a continuation of U.S. Ser. No. 06/613,080, field May 22, 1984, now abandoned.

FIELD OF THE INVENTION

The present invention generally relates to a flower pot cover having controlled pleats in the skirt or base or both and apparatus for effecting such controlled pleats.

DESCRIPTION OF THE PREFERRED EMBODIMENTS

Figure 1:
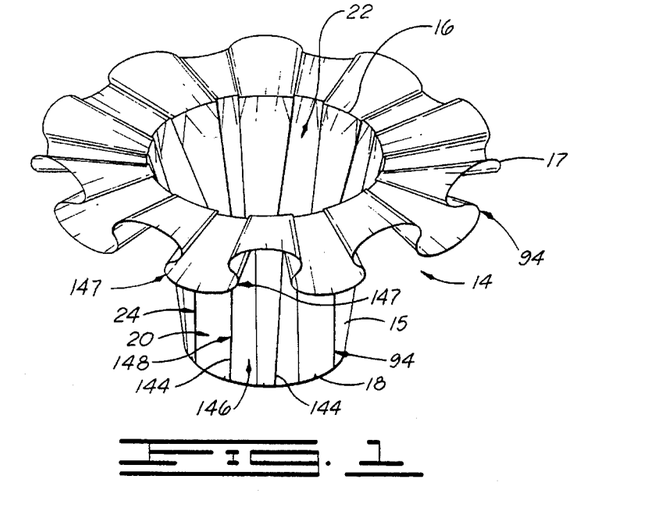
FIG. 1 is a partial perspective view of a flower pot or flower pot cover having controlled pleats and being constructed in accordance with the present invention.
Figures 4, 5, 6:
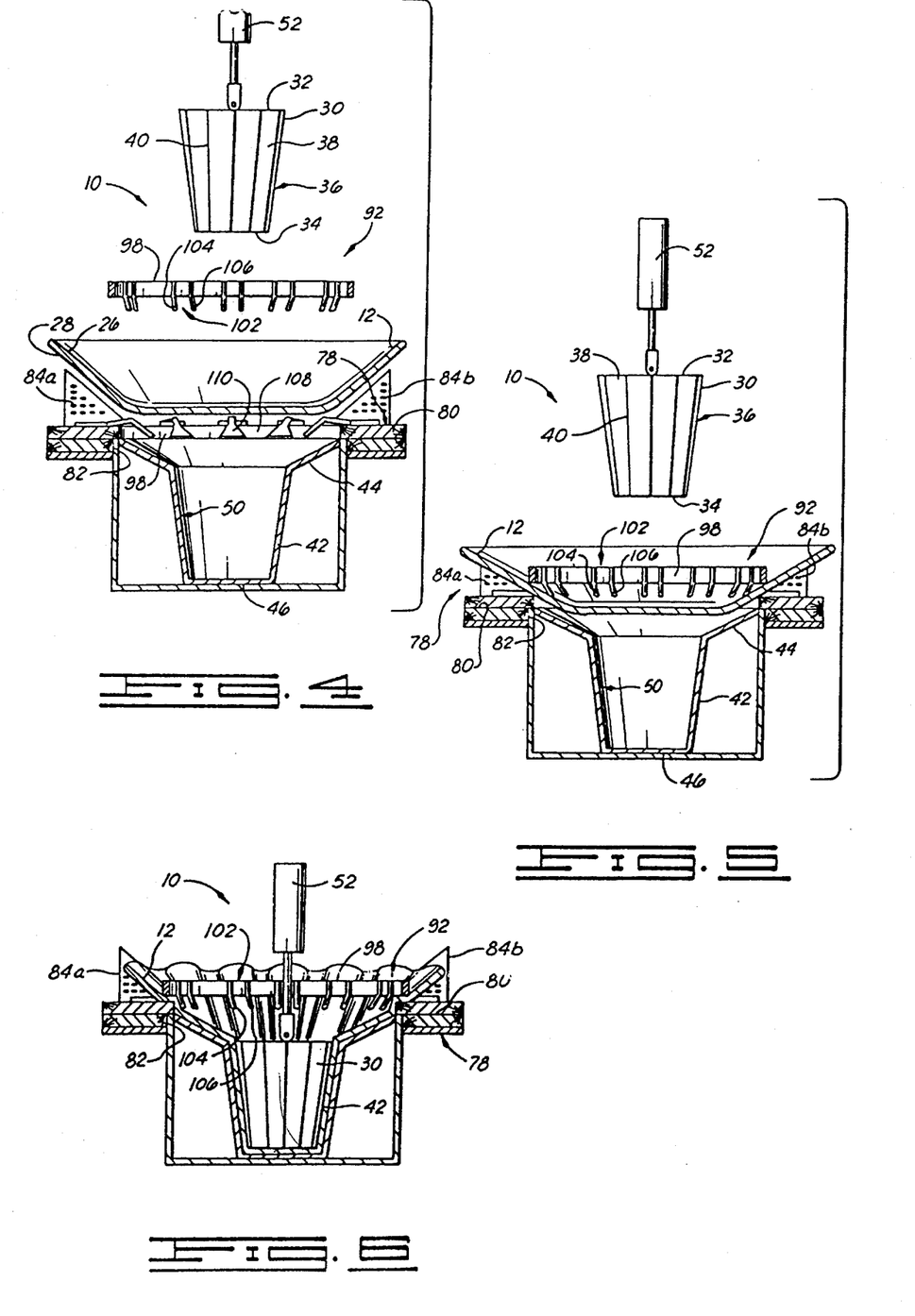
FIG. 4 is a view exactly like FIG. 3, except showing a sheet of material disposed between the male and the female dies.
FIG. 5 is a view exactly like FIG. 4, except showing the pleat control assembly in the engaging position and showings the male and female dies in the storage position.
FIG. 6 is a view exactly like FIG. 5, except showing the pleat control assembly in the engaging position and showings the male and the female dies in the forming position.

Shown in FIGS. 3, 4, 5 and 6 is an article forming apparatus 10 which is constructed in accordance with the present invention. The article forming apparatus 10 is adapted to form at least one sheet of material into an article or, more particularly, a flower pot or flower pot cover having a predetermined shaped with control led pleats formed in predetermined portions thereof and having predetermined shapes. A sheet of material 12 is shown in FIGS. 4, 5 and 6 and the sheet of material formed into a decorative flower pot or flower pot cover 14 is shown in FIGS. 1 and 2.

The sheet of material 12 has a relatively small thickness, preferably less than about 3 mils. However, depending upon the type of materials selected and the desired effect in the formed flower pot or flower pot cover 14, the sheet of material may have a thickness in a range from less than about 1.5 mils to about 30 mils. The sheet of material is constructed of a material selected from the group of materials consisting of cellophane, man-made organic polymer films, metallic foil, burlap, fabric or paper or combinations thereof.

The term "man-made organic polymer film" means a man-made resin such as a polypropylene as opposed to naturally occurring resins such as cellophane.

A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly inked. Such films are synthetic polymers formed or synthesized from monomers. Further, a relatively substantially linearly linked processed organic polymer film is virtually waterproof which may be desirable in many applications such as wrapping a floral grouping Additionally a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention. For example, one man-made organic polymer film is a polypropylene film.

Figures 2, 3:
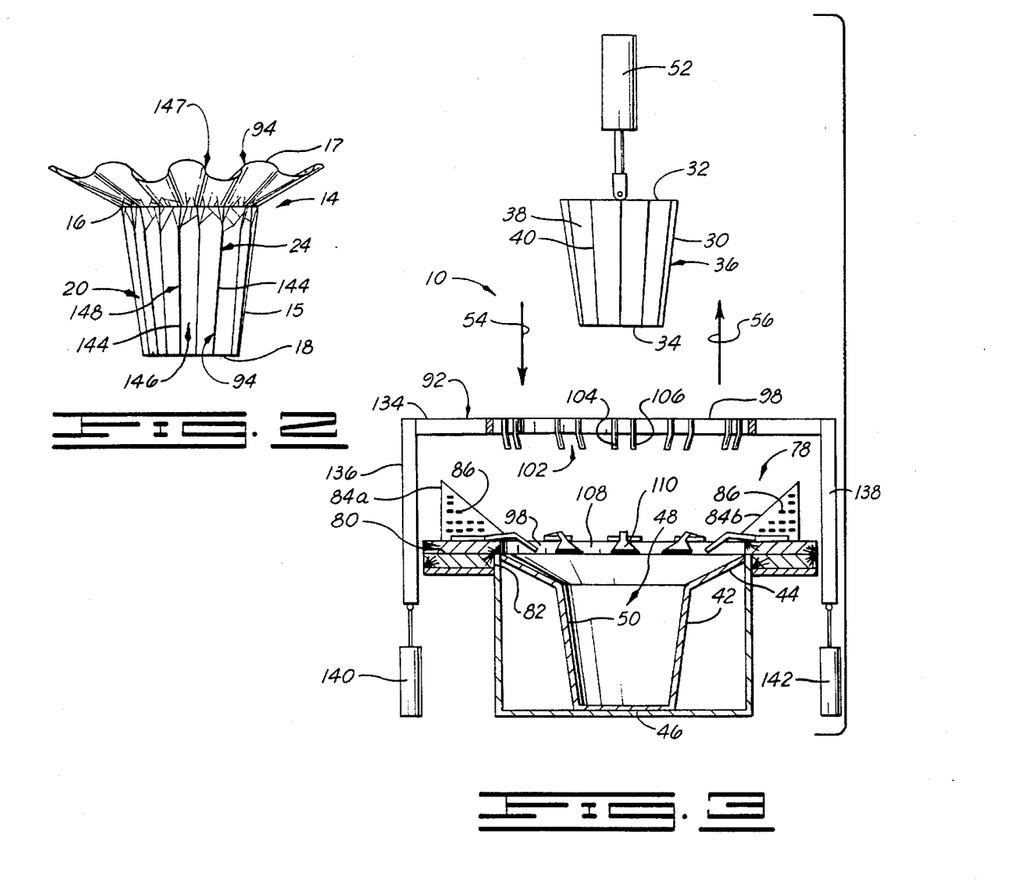
FIG. 2 is a side elevational view of the flower pot or flower pot cover of FIG. 1.
FIG. 3 is a side elevational, partial sectional, partial diagrammatic view of an article forming apparatus constructed in accordance with the present invention and showing a pleat control assembly portion of the article forming apparatus in a storage position and showing the male and female dies portion of the article forming apparatus in the storage position.

As shown in FIGS. 1 and 2, the flower pot or flower pot cover 14 comprises a base 15 and a skirt 17. The base 15 has an opened upper end 16, a closed lower end 18 and an outer peripheral surface 20. The skirt 17 extends angularly upwardly and outwardly from the upper end 16 of the base 15 and the skirt 17 extends circumferentially about the open upper end 16. An object opening 22 is formed through the upper end 16 of the base 15 and the object opening 22 extends a distance through the base 15.

When the article is constructed to be used as a flower pot, the object opening 22 is shaped and adapted to receive portions of a floral grouping and soil for example. When the article is designed and constructed to be used as a flower pot cover, the object opening 22 is sized and shaped to receive a flower pot whereby the flower pot cover 14 provides a decorative cover for the flower pot.

The term "floral grouping" as used herein means cut fresh flowers, artificial flowers, other fresh and/or artificial plants or other floral materials and may include other secondary plants and/or ornamentation which add to the aesthetics of the overall floral grouping.

The flower pot or flower pot cover 14 is formed utilizing the article forming apparatus 10. The base 15 includes at predetermined positions a plurality of sealed or creased portions 24 (only one of the sealed or creased portions 24 is designated by a reference numeral in FIG. 1). The sealed or creased portions 24 may be connected by heat sealing or adhesive to give structural integrity to the base 15 for cooperating to maintain the base 15 in the predetermined shape of the flower pot or flower pot cover.

As shown in FIG. 4, the sheet of material has an upper surface 26 and a lower surface 28. Either the upper surface 26 or the lower surface 28 or both are adapted to be bondable so that, when portions of the bondable surface are brought into bondable contact, such portions are bondably connected. The sealed or creased portions 24 are formed by overlapping portions of the bondable surface and bringing such overlapping portions into and bondable engagement or contact. In this manner, the sealed or creased portions 24 are permanently fixed in the flower pot or flower pot cover 14.

The forming of a flower pot cover from a sheet of material formed between a male and a female die is disclosed in detail in the co-pending application entitled "ARTICLE FORMING SYSTEM", U.S. Pat. No. 4,773,182, issued Sep. 27, 1988 and the disclosure of this co-pending application specifically hereby is incorporated herein by reference.

Figure 11:
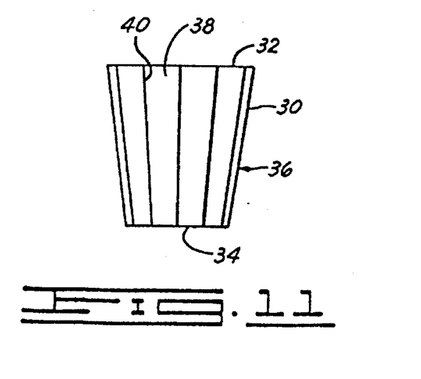
FIG. 11 is a side elevational view of the male die.
Figure 12:
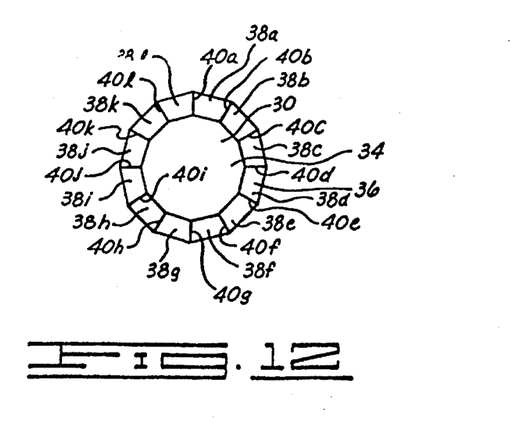
FIG. 12 is a bottom plan view of the male die.

As shown in FIGS. 3, 4, 5, 6, 11 and 12, the article forming apparatus 10 includes a male die 30 having an upper end 32, a lower end 34, and a male die surface 36 formed on the outer peripheral surface of the male die 30. The male die surface 36 forms a generally cylindrically or more particular frusto-conically shaped male die 30 having at least one flat or recessed area 38 formed thereon and extending generally between the upper end 32 and the lower end 34 of the male die 30. As shown in FIG. 12, the male die 30 has twelve flat or recessed areas designated in FIG. 12 by the reference numerals 38a, 38b, 38c, 38d, 38e, 38f, 38g, 38h, 38i, 38j, 38k and 38l.

As shown in FIGS. 11 and 12, a matingly area 40 is formed between each of the flat or recessed areas 38. As shown in FIG. 12, the male die 30 has twelve mating areas 40 which are designated in FIG. 12 by the referenced numerals 40a, 40b, 40c, 40d, 40e, 40f, 40g, 40h, 40j, 40i, 40k and 40l.

As shown in FIGS. 3, 4, 5 and 6 the article forming apparatus 10 also includes a female die 42 having an upper end 44 and a lower end 46. An opening 48 is formed through the upper end 44 of the female die 42 and the opening 48 extends a distance through the female die 42 terminating with the lower end 46. The opening 48 forms a female die surface 50 which extends circumferentially about the female die and includes the lower end 46. The opening 48 is sized and shaped to receive the male die with a sufficient clearance therebetween to accommodate portions of the sheet of material 12 disposed therebetween during the forming of the decorative flower pot or flower pot cover 14. More particularly, the female die surface 50 is shaped to formingly mate with the mating areas 40 formed on the male die 30 with the flat or recessed areas 38 being spaced a distance from the female die surface 50 in the forming position of the male die 30 and the female die 42. The female die surface 50 also is generally cylindrically or more particularly frusto-conically shaped.

As shown in FIGS. 3, 4, 5 and 6, a rod is reciprocatingly disposed in a hydraulic cylinder 52 and the rod of the hydraulic cylinder 52 is connected to the upper end 32 of the male die 30. The hydraulic cylinder 52 is adapted and positioned to move the male die 30 in a downwardly direction 54 (FIG. 3) to the forming position (shown in FIG. 6) and to move the male die 30 in an upwardly direction 56 (FIG. 3) to a storage position (shown in FIGS. 2, 4 and 5). The hydraulic cylinder 52 is connected to a support assembly (not shown) and the hydraulic cylinder 52 and the support assembly (not shown) cooperate to support the male die 30 a distance above the female die 42 in the storage position of the male die 30.

A plurality of openings (not shown) may be formed through the male die 30. The openings (not shown) can be in communication with a vacuum source (not shown) and a blower (not shown). In one position, communication is established between the vacuum source and the openings in the male die 30. In one other position, communication is established between the blower and the openings in the male die 30.

An air supply (not shown) is connected to the hydraulic cylinder 52. In one position, the air supply (not shown) is connected to the upper end of the hydraulic cylinder 52 for moving the male die 30 in the downwardly direction 54. In one other position, the air supply (not shown) is connected to the lower end of the hydraulic cylinder 52 for moving the male die 30 in the upwardly direction 56. In a third position, communication is interrupted between the hydraulic cylinder 52 and the air supply (not shown). When the male die 30 reaches the storage position, the male die 30 engages a switch (not shown) to position communication in the third position.

A plurality of cartridge type heating elements (not shown) may be connected to the male die 30. Each of the heating elements is disposed in a cylinder in an inner portion of the male die 30 and the heating elements are positioned about the male die 30 to heat the male die surface 36 to a predetermined temperature level during the operation of the article forming apparatus 10. Each of the heating elements is connected to an electrical power supply (not shown).

A plurality of cartridge type heating elements (not shown) may be connected to the female die 42. The heating elements are positioned about the female die surface 50 and connected to an electrical power supply for heating the female die surface 50 to a predetermined temperature level for forming the flower pot or flower pot cover 14 in accordance with the present invention.

As shown in FIGS. 3, 4, 5 and 6, the article forming apparatus 10 includes a platform 78 having an upper surface 80 and an opening 82 formed through a central portion thereof. The female die 42 is disposed through the opening 82 to a position wherein the upper end 44 of the female die 42 is disposed generally adjacent the upper surface 80. The platform 78 is connected to the support assembly (not shown) and the support assembly is adapted to support the platform 78 so the upper surface 80 is disposed in a substantially horizontal plane.

Figure 10:
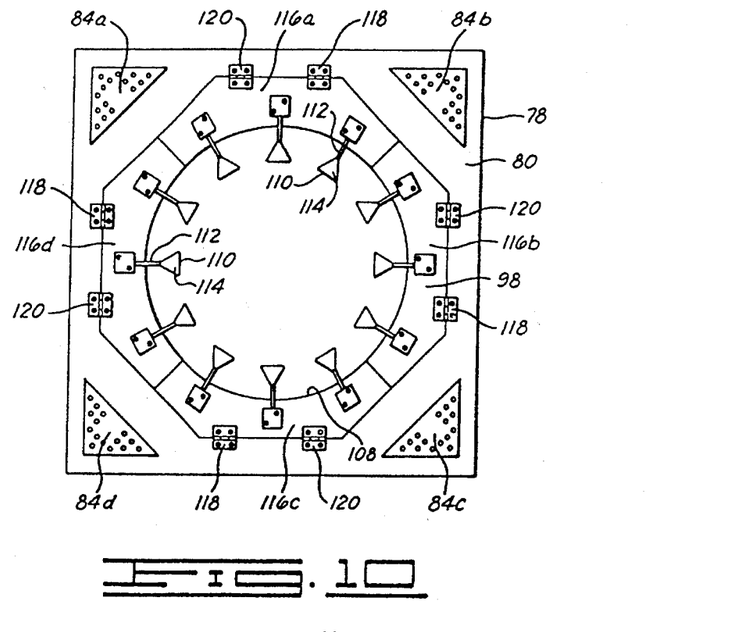
FIG. 10 is a top plan view of the lower ring portion of the pleat control assembly.

Four circumferentially spaced inclined support surfaces 84 are positioned on the upper surface 80 with each inclined support surface 84 extending a distance angularly upwardly and outwardly from the female die 50. Four included support surfaces 84 are shown in FIGS. 3, 4, 5, 6 and 10 and designated therein via the respective reference numerals 84a, 84b, 84c and 84d. Each inclined support surface 84 is generally triangularly shaped with the base of each triangularly shaped inclined support surface 84 being disposed on the upper surface 80. The inclined support surfaces are spaced apart at about 90° F. intervals circumferentially about the opening 48 and the female die 42. The inclined support surfaces 84 are arranged about the female die 42 so the edges of the support surfaces cooperate to form a substantially square shape in a plan view as shown in FIG. 10 with the outermost ends of the inclined support surfaces 84 forming the corners of this square shape.

A plurality of hold openings 86 are formed through each of the incline support surfaces 84 (only two of the hold openings 86 being designated with the reference numeral in FIG. 3). The hold openings 86 in each inclined support surface 84 are in communication with a space enclosed by that inclined surface 84.

A vacuum source (not shown) is connected to each of the spaces enclosed by the incline support surfaces 84. The vacuum source is in communication with the hold openings 86 in one condition.

As shown in FIGS. 3–10, the article forming apparatus 10 includes a pleat control assembly 92. The pleat control assembly 92 engages predetermined portions of the sheet of material and cooperates to form pleats having a predetermined shape at predetermined positions in the sheet of material 12 whereby the flower pot or flower pot cover 14 has pleats 94 (FIGS. 1 and 2) formed in predetermined portions thereof and at predetermined positions thereon with each pleat 94 having a predetermined shape.

The pleat control assembly includes an upper ring 96 (FIGS. 3, 4, 5, 6 and 9) and a lower ring 98 (FIGS. 3, 4 and 10). The flat or recessed areas 38 and the mating areas 40 in the male die 30 cooperate with the female die surface 50 to form a portion of the pleat control assembly 92 for forming the flower pot or flower pot cover 14 having the pleats 94.

The upper ring 96 is generally circularly shaped and has an opening 100 (FIG. 9) formed through a central portion thereof. The opening 100 is sized and shaped so that the male die 30 can be moved through the opening 100 in the upper ring 96 during the forming operation.

Figures 7, 8:
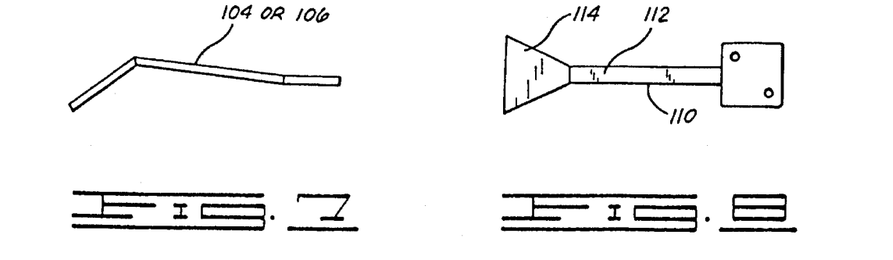
FIG. 7 is a side elevational view of one of the fingers on the upper ring.
FIG. 8 is a top plan view showing one of the fingers on the lower ring.
Figure 9:
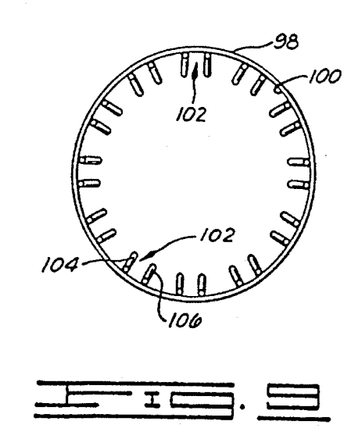
FIG. 9 is a top plan view of the upper ring portion of the pleat control assembly of the present invention.

A plurality of pairs of fingers 102 (FIGS. 3, 4, 5, 6 and 9) are connected to the upper ring 96 with each pair of fingers 102 comprising a first finger 104 and the second finger 106. Only some of the pairs of fingers 102 and only one of the first and second fingers 104 and 106 are designated with reference numerals in FIGS. 3, 4, 5, 6 and 9. A typical finger 104 or 106 is shown in FIG. 7.

The lower ring 98 has an opening 108 (FIGS. 3, 4 and 10) formed through a portion thereof. The opening 108 is shaped and sized to be about the same as the opening 48 generally at the upper end 44 of the female die 42. The lower ring 98 is positioned on the platform 78 so that the opening 108 in the lower ring 98 is aligned with the opening 48 in the female die 42.

The lower ring 98 includes a plurality of fingers 110 (only some of the fingers 110 are designated in FIGS. 3, 4 and 10 with reference numerals). Each of the fingers 110 is connected to the lower ring 98 and each of the fingers 110 extends a distance inwardly into the opening 108 formed in the lower ring 98. Each of the fingers 110 includes a finger stem 112 (FIG. 10) and a generally triangularly shaped finger base 114. Each of the fingers 110 extends inwardly into the opening 108 in the lower ring 98 and each of the fingers 110 extends a distance generally downwardly at an angle through the opening 108. A typical finger 110 is shown in FIG. 8.

It should be noted that the finger 110 could be constructed of two separate fingers with each finger extending along a path defined by one side of the finger 110.

Each of the pairs of fingers 102 in the upper ring 96 extends at an angle inwardly toward the opening 100 in the upper ring 96. As shown more clearly in FIG. 14, each of the pairs of fingers 102 on the upper ring 96 is positioned so that the first finger 104 is disposed generally on one side of one of the fingers stems 112 with the first finger 104 extending a distance generally under a portion of the finger stem 112 and finger base 114 of one of the fingers 110 when the upper ring 96 and the lower ring 98 are positioned in the engaging position. Further, the pairs of fingers 102 are positioned on the upper ring 96 so that each second finger 106 is positioned generally on the side of one of the finger stem 112, opposite the side of the finger stem 112 having the first finger 104 positioned nearby. Each second finger 106 extends generally under a portion of one of the finger stems 112 and the finger base 114 connected thereto in the engaging position of the upper and the lower rings 96 and 98.

Figure 13:
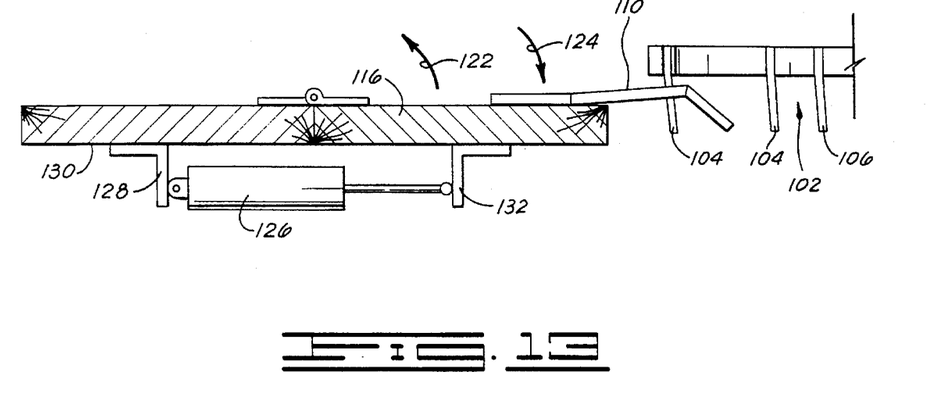
FIG. 13 is a partial sectional, partial elevational view showing a portion of the upper ring and a portion of the lower ring and showing a typical ring segment for illustrating the disengagement of the lower ring with the formed article.

As shown in FIG. 10, the lower ring 98 comprises four ring segments 116 with the ring segments 116 being designated in FIGS. 2 and 3 by the respective reference numerals 116a, 116b, 116c and 116d. Each of the segments 116 is connected to the upper surface 80 by way of a pair of hinges 118 and 120. The ring segments 116 are hingedly movable in an upwardly direction 122 (shown in FIG. 13) and a downwardly direction 124 (shown in FIG. 13). The article forming apparatus 10 includes four hydraulic cylinders 126 with each hydraulic cylinder 126 being connected to one of the ring segments 116. A typical hydraulic cylinder 126 as shown in FIG. 4. A cylinder base of each hydraulic cylinder 126 (FIG. 13) is pivotally connected to the platform 78 by way of a bracket 128 (FIG. 13). Each hydraulic cylinder 126 is disposed generally below a lower surface 130 of the platform 78. The cylinder rod portion of each hydraulic cylinder 126 is pivotally connected to one of the ring segments 116 by way of a bracket 132.

Each of the hydraulic cylinders 126 is connected to an air supply (not shown). When the hydraulic cylinders 126 are actuated to reciprocatingly move the cylinder rod outwardly from the cylinder base, the hydraulic cylinders 126 act to pivotally move the ring segments 116 in the upwardly direction to a disengaged position. When the hydraulic cylinder 126 are actuated to reciprocatingly move the cylinder rod into the cylinder base, the hydraulic cylinders 126 act to move the ring segments 116 in a downwardly direction 124 to an operating position.

As shown in FIG. 3, the upper ring 96 is connected to and supported on a cross bar 134. One end of a first leg support 136 is connected one end of the cross bar 134 and one end of a second leg support 138 is connected to the opposite end of the cross bar 134. The cylinder rod portion of a hydraulic cylinder 140 is connected to the first leg support 136 and the cylinder rod portion of a hydraulic cylinder 142 is connected to one end of the second leg support 138. The hydraulic cylinders 140 and 142 each are connected to the air supply 68. The hydraulic cylinders 140 and 142 are supported on the support assembly 58.

When the hydraulic cylinders 140 and 142 are actuated to reciprocatingly move the cylinder rod portion out of the cylinder base portion of the respective hydraulic cylinders 140 and 142, the hydraulic cylinders 140 and 142 cooperate to move the upper ring 96 in the upwardly direction 54 to a storage position. When the hydraulic cylinders 140 and 142 are actuated to reciprocatingly move the cylinder rods into the cylinder bases of the respective hydraulic cylinders 140 and 142, the hydraulic cylinders 140 and 142 cooperate to move the upper ring 96 in the downwardly direction 54 to the engaging position.

In operation, the ring segments 116 initially are positioned in the operating position, as shown in the drawings. The upper ring 96 is positioned in the storage position and the male die 30 is positioned in the storage position. In this condition, a sheet of material 12 is placed over the platform 78 with a portion of the sheet of material 12 being disposed generally over the lower ring 98, as shown in FIG. 4. The vacuum connected to the included support surfaces 84 through the hold openings 86 cooperates to assist in releasably holding and keeping the sheet of material in place until the upper ring 96 and the lower ring 98 are moved into the engaging position.

The hydraulic cylinders 140 and 142 then are actuated to move the upper ring 96 in the downwardly direction 54 to an engaging position (shown in FIGS. 5 and 6) wherein the upper ring 96 is disposed generally on and over the lower ring 98. As the upper ring 96 is moved into the engaging position, the first and the second fingers 104 and 106 of each pair of fingers 102 engage a portion of the sheet of material 12. Each first finger 104 engages a portion of the sheet of material 12 and moves the engaged portion of the sheet of material 12 generally under a portion of the finger stem 112 and finger base 114 of one of the fingers 110. The second finger 106 of each pair of fingers 102 engages a portion of the sheet of material 12 and moves or folds the engaged portion of the sheet of material 12 generally under a portion of the finger stem 112 and finger base 114 of one of the fingers 110 thereby forming a pair of pleat 94 generally about each of the fingers 110 wherein adjacent pleats 94 are reversely shaped relative to one another.

After the upper and lower rings 96 and 98 have been moved to the engaging position, the hydraulic cylinder 52 then is actuated to move the male die in the downwardly direction 54. The male die 30 moves in the downwardly direction 54 to a position wherein the lower end 34 of the male die 30 engages the sheet of material 12. The male die 30 continues to be moved in the downwardly direction 54 thereby moving the sheet of material into the opening 48 in the female die 42. The male die 30 continues to be moved in the downwardly direction 54 to the forming position (shown in FIG. 6) wherein the male die 30 is disposed in the opening 48 in the female die 42 with portions of the sheet of material 12 being disposed generally between the male die surface 36 and the female die surface 50.

As the sheet of material 12 is moved into the opening 48 in the female die 42 by the male die 30, sealed or creased portions 24 are formed in predetermined portions of the sheet of material 12. Further, as the male die 30 is moved into the opening 48 in the female die 42 along with portions of the sheet of material 12, portions of the sheet of material 12 are pulled or channeled between each of the pairs of fingers 102 and one of the fingers 110 for continuing to form the pleats 94 in the sheet of material 12.

In the forming position, the mating areas 40 on the male die are matingly disposed generally near the female die surface 50 of the female die 42. The portions of the sheet of material 12 disposed generally between the mating areas 40 and the adjacent areas of the female die surface 50 are formed into the sealed or creased portions 24 which are heat or adhesively or both sealingly connected. The portions of the sheet of material 12 disposed between the flat or recessed areas 38 and the adjacent portions of the female die surface 50 are not formed into sealed or creased portions since the sheet of material 12 is not compressed between the flat or recessed areas 38 and the adjacent portions of the female die surface 50. The mating areas 40 cooperate with the female die surface 50 to form sealed strips 144 (shown in FIGS. 1 and 2) with each sealed strip 144 extending generally between the upper and the lower ends 16 and 18 of the flower pot or flower pot cover 14. The mating areas 40 on the male die 30 are positioned so that one sealed strip 144 is formed on the pleats 94.

Between each adjacent pair of sealed strips 144 is a non-sealed strip 146. The non-sealed strip 146 extends generally between the upper end 16 and the lower end 18 of the flower pot or flower pot cover 14. Any folds in this area (non-sealed strips 146) are not sealed or connected since this non-sealed strip 146 is formed by the portion of the sheet of material 12 disposed in the flat or recessed areas 38 and between the flat or recessed areas 38 and the adjacent portions of the female die surface 50.

More particularly, the pairs of fingers 102 on the upper ring 96 and the fingers 110 on the lower ring 98 cooperate to form pleats 147 in the skirt 17 of the flower pot or flower pot cover 14 and the recessed areas 38 and mating areas 40 on the male die 30 cooperate with the female die surface 50 to form pleats 148 in the base 15 of the flower pot or flower pot cover 14. The fingers 110 and the pair of fingers 102 also cooperate to form the pleats 148 in the base 15 of the flower pot or flower pot cover 14.

Figure 14:
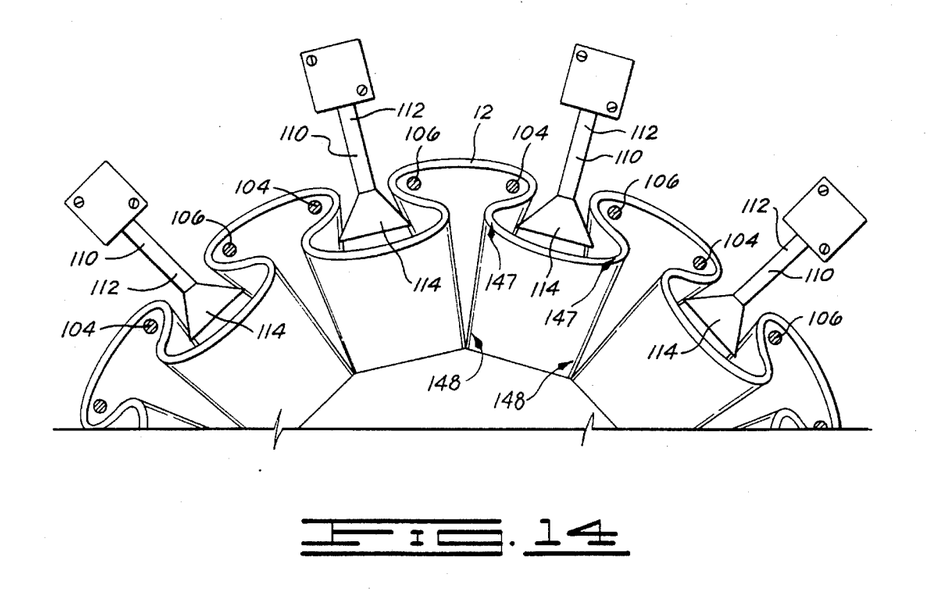
FIG. 14 is a top plan view showing the fingers on the lower ring and the pairs of fingers on the upper ring in the engaging position with the sheet of material disposed and formed therebetween.

Each pleat 148 in the base 15 is generally aligned with one of the pleats 147 formed in the skirt 17. The pleats 147 and 148 cooperate to provide an overall pleated appearance to the flower pot or flower pot cover 14. As the sheet of material 12 continues to be moved into the female die 42 by the male die 30, the fingers 110 in the lower ring 98 and the pairs of fingers 102 in the upper ring 96 continue to engage the sheet of material 12 and continue to form the pleats 147 in the skirt 17 and continue to cooperate to form the pleats 148 in the base 15 portion of the flower pot or flower pot cover 14. As best shown in FIG. 14, the finger base 114 of the fingers 110 and the fingers 104 and 106 of the pair of fingers 102 cooperate to shape the pleats 147 and 148 such that the pleats 147 and 148 are reversely shaped relative to the adjacent pleats 147 and 148.

After the forming of the flower pot or flower pot cover 14 and with the male die 30 in the forming position, the upper ring 96 is moved in the upwardly direction 56 to the storage position thereby disengaging the pairs of fingers 102 from the formed flower pot or flower pot cover 14. Then, the hydraulic cylinders 126 each are actuated to move each of the ring segments 116 respectively in the upwardly direction 122 to the disengage position, thereby disengaging the fingers 110 from the formed flower pot or flower pot cover 14.

After the upper and the lower rings 96 and 98 have been disengaged from the formed flower pot or flower pot cover 14, the hydraulic cylinder 52 is actuated to move the male die 30 in the upwardly direction 56 to the storage position. In one embodiment, the male die 30 has the opening and the male die 30 is connected to the vacuum source so that the vacuum removably connects the formed flower pot or flower pot cover 14 to the male die 30. In this embodiment, the male die 30 lifts the formed flower pot or flower pot cover 14 from the female die 42. In this last-mentioned embodiment, the blower 64 also can be connected to the male die 30 for blowing the formed flower pot or flower pot cover 14 off the male die via the openings 60 in the male die 30.

It should be noted that, in lieu of shaping the entire male die surface 36, the male die surface 36 can be frusto-conically shaped and a plate can be attached to the lower end of the male die 30 with the plate being shaped to include the recessed areas 38 and the mating areas 40.

Figure 15:
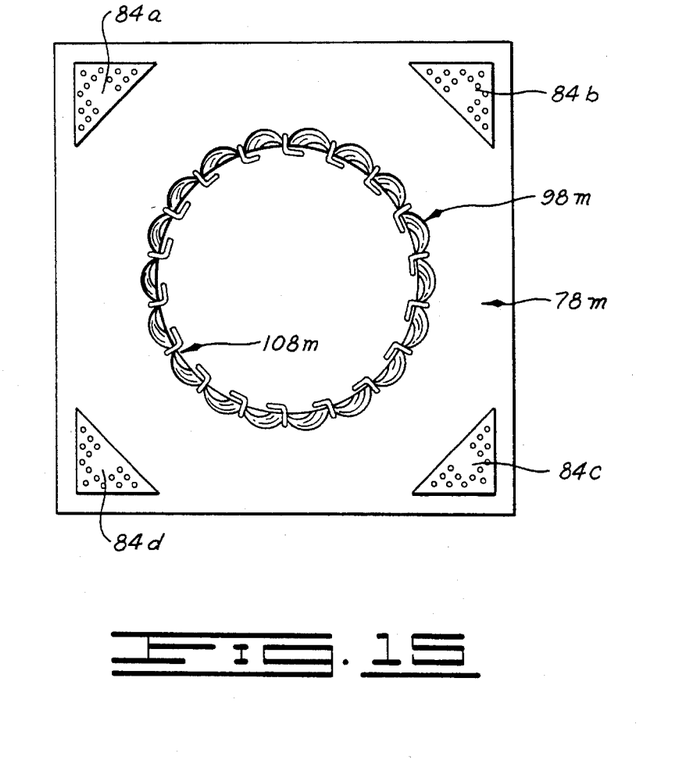
FIG. 15 is a top plan view showing a modified lower ring.
Figure 16:
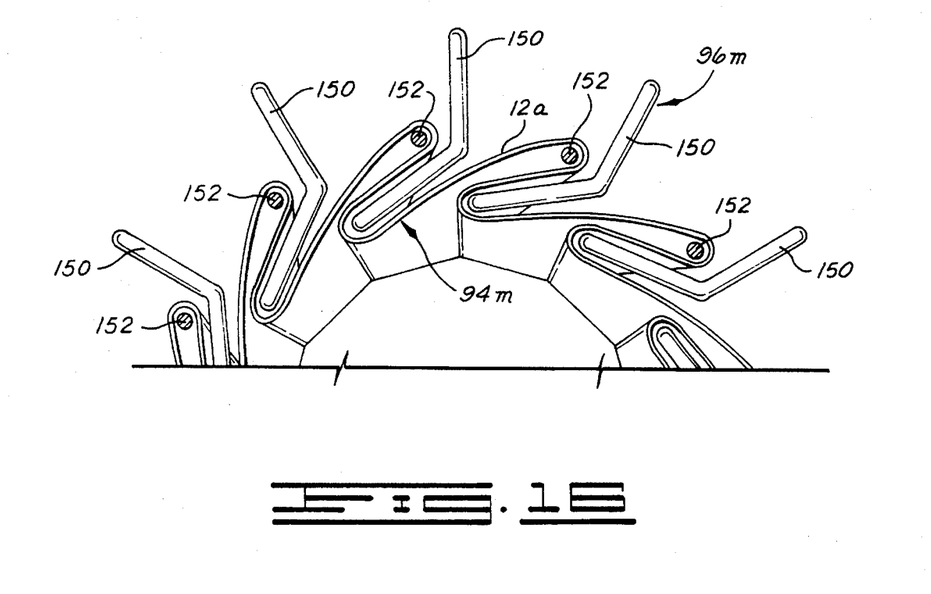
FIG. 16 is a top plan view showing a portion of the modified lower ring of FIG. 15 in the engaging position with a portion of a modified upper ring, only the finger portion of the upper ring and the finger portion of the lower ring being showing in FIG. 16 engaged with a sheet of material.

EMBODIMENTS OF FIGS. 15 AND 16

Shown in FIGS. 15 and 16 is a portion of a modified upper ring 96m adapted to be used with the modified lower ring 98m.

The upper ring 96m includes a plurality of fingers 150 each finger 150 being connected to the upper ring 96m and each finger 150 extending into the opening at a downwardly extending angle. The fingers 150 are in the form of cylindrically shaped rods. The fingers 150 are spaced circumferentially about the opening in the upper ring 96m.

The lower ring 98m includes a plurality of fingers 152. Each of the fingers 152 extends a distance into the opening 108m in the lower ring 98m and each of the fingers 152 is angled downwardly through the opening 108m. The fingers 152 are spaced circumferentially about the lower ring 98m. Each of the fingers 152 is positioned on the lower ring 98m and generally aligned with one of the fingers 150 on the upper ring 96m so that, when the upper and the lower rings 96m and 98m are brought into the engaging position, each finger 150 on the upper ring 96m engages the sheet of material and folds the engaged portion of the sheet of material generally under one of the fingers 152m on the lower ring 98m thereby forming a modified pleat 94m in the skirt. With this embodiment, and using male die 30 described in detail before, the pleats 148 are formed in the base 15 of the flower pot or flower pot cover 14 and each of the pleats 148 in the base 15 is generally aligned with one of the pleats 94m in the skirt 17 to provide a flower pot or flower pot cover 14 having a generally overall pleated appearance.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. An article for covering a flower pot, comprising:

a base formed into a predetermined shape having a closed lower end, an open upper end, and an object opening dimensioned to receive the flower pot, the base formed of a flexible sheet of material and having a plurality of pleats spaced circumferentially about the base formed by overlapping portions of the sheet of material, each of the pleats extending from the upper end to the lower end and each pleat having a predetermined shape which is reversely shaped relative to the adjacent pleats in the base such that the base is provided with alternating reversely shaped pleats, the sheet of material having an upper surface and a lower surface with at least one of the upper surface and the lower surface being a bondably connectable surface such that the overlapping portions of one of the upper surface and the lower surface are bondingly connected to retain the base in the predetermined shape; and a skirt extending from the open upper end of the base, the skirt having a plurality of pleats spaced circumferentially about the skirt formed by overlapping portions of the skirt, each pleat having a predetermined shape which is reversely shaped relative to the adjacent pleats in the skirt such that the skirt is provided with alternating reversely shaped pleats, each of the pleats in the skirt are aligned with a corresponding one of the pleats in the base and the overlapping portions of the skirt are substantially unconnected to one another.

\* \* \* \* \*

UNITED STATES PATENT AND TRADEMARK OFFICE
CERTIFICATE OF CORRECTION

PATENT NO. : 5,501,039
DATED : March 26, 1996
INVENTOR(S) : Weder et al.

It is certified that error appears in the above-indentified patent and that said Letters Patent is hereby corrected as shown below:

Column 1, line 19, please delete "Pat. No. 0,318,030" and substitute therefor --Pat. No. Des. 318,030--.

Column 2, line 16, please delete "showing" and substitute therefor --shown--.

Column 2, line 25, please delete "control led" and substitute therefor --controlled--.

Column 2, line 50, please delete "inked" and substitute therefor --linked--.

UNITED STATES PATENT AND TRADEMARK OFFICE
CERTIFICATE OF CORRECTION

PATENT NO. : 5,501,039

DATED : March 26, 1996

INVENTOR(S) : Weder et al.

It is certified that error appears in the above-identified patent and that said Letters Patent is hereby corrected as shown below:

Column 2, line 54, after "grouping" please insert --.--.

Column 3, line 35, after "into" please delete "and".

Column 3, line 48, please delete "particular" and substitute therefor --particularly--.

Column 3, line 56, please delete "matingly" and substitute therefor --mating--.

Column 3, line 60, please delete "referenced" and substitute therefor --reference--.

Column 5, line 10, please delete "female die 50" and substitute therefor --female die 42--.

Column 5, line 16, after "90°" please delete "F".

Column 5, line 24, please delete "incline" and substitute therefor --inclined--.

Column 5, line 30, please delete "incline" and substitute therefor --inclined--.

Column 6, line 21, please delete "fingers" and substitute therefor --finger--.

Column 6, line 27, please delete "stem" and substitute therefor --stems--.

UNITED STATES PATENT AND TRADEMARK OFFICE
CERTIFICATE OF CORRECTION

PATENT NO. : 5,501,039     Page 3 of 4
DATED     : March 26, 1996
INVENTOR(S) : Weder et al.

It is certified that error appears in the above-identified patent and that said Letters Patent is hereby corrected as shown below:

Column 6, line 43, please delete "as" and substitute therefor --is--.

Column 6, line 58, please delete "cylinder 126" and substitute therefor --cylinders 126--.

Column 7, lines 3-4, please delete "the air supply 68" and substitute therefor --an air supply (not shown)--.

Column 7, line 5, please delete "the support assembly 58" and substitute therefor --a support assembly (not shown)--.

Column 7, line 10, please delete "upwardly direction 54" and substitute therefor --upwardly direction 56--.

Column 7, line 24, please delete "included" and substitute therefor --inclined--.

Column 7, line 44, please delete "pleat 94" and substitute therefor --pleats 94--.

Column 9, lines 8-9, please delete "the blower 64" and substitute therefor --a blower (not shown)--.

Column 9, line 11, please delete "the openings 60" and substitute therefor --openings (not shown)--.

UNITED STATES PATENT AND TRADEMARK OFFICE
CERTIFICATE OF CORRECTION

PATENT NO. : 5,501,039

DATED : March 26, 1996

INVENTOR(S) : Weder et al.

It is certified that error appears in the above-indentified patent and that said Letters Patent is hereby corrected as shown below:

Column 9, line 38, delete "fingers 152m" and substitute therefor —fingers 152—

Signed and Sealed this

Seventeenth Day of September, 1996

Attest:

BRUCE LEHMAN

Attesting Officer

Commissioner of Patents and Trademarks